(12) United States Patent
Christy et al.

(10) Patent No.: US 11,900,546 B1
(45) Date of Patent: Feb. 13, 2024

(54) SYNCHRONIZED ANALYSIS OF MIXED-REALITY OLAP AND SUPPLY CHAIN NETWORK VISUALIZATIONS

(71) Applicant: Blue Yonder Group, Inc., Scottsdale, AZ (US)

(72) Inventors: Brenda Christy, Bangalore (IN); Mayank Tiwari, Hyderabad (IN); Tushar Shekhar, Bengaluru (IN)

(73) Assignee: Blue Yonder Group, Inc., Scottsdale, AZ (US)

(*) Notice: Subject to any disclaimer, the term of this patent is extended or adjusted under 35 U.S.C. 154(b) by 227 days.

(21) Appl. No.: 17/145,621

(22) Filed: Jan. 11, 2021

Related U.S. Application Data

(60) Provisional application No. 62/972,214, filed on Feb. 10, 2020.

(51) Int. Cl.
| | | |
|---|---|---|
| *G06T 19/00* | (2011.01) | |
| *G06Q 10/0639* | (2023.01) | |
| *G06Q 10/087* | (2023.01) | |
| *G06F 3/01* | (2006.01) | |
| *G06T 19/20* | (2011.01) | |

(52) U.S. Cl.
CPC .......... *G06T 19/006* (2013.01); *G06F 3/013* (2013.01); *G06F 3/017* (2013.01); *G06Q 10/06393* (2013.01); *G06Q 10/087* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 10,353,922 B1* | 7/2019 | Stolte | G06F 16/283 |
| 2012/0198351 A1* | 8/2012 | Lee | G06F 11/3688 |
| | | | 715/744 |

(Continued)

FOREIGN PATENT DOCUMENTS

| | | | | |
|---|---|---|---|---|
| GB | 2553256 A | * | 3/2018 | G06F 17/30 |

OTHER PUBLICATIONS

Author: Ordonez et al.; Title: Interactive Exploration and Visualization of OLAP Cubes; Date: 2011; Source: https://dl.acm.org/doi/abs/10.1145/2064676.2064691 (Year: 2011).*

*Primary Examiner* — Jwalant Amin
(74) *Attorney, Agent, or Firm* — Spencer Fane LLP; Steven J. Laureanti

(57) ABSTRACT

A system and method are disclosed to generate mixed-reality visualizations and objects to facilitate efficient interaction with large volumes of data. Embodiments include a computer comprising a processor and memory and configured to select data stored in a data table coupled to the computer. Embodiments select one or more key process indicators (KPIs), dimensions by which to display the selected data, and color schemes by which to display the selected data. Embodiments generate a first mixed-reality object displaying the selected data according to the selected one or more KPIs, dimensions, and color schemes, and a second mixed-reality object displaying the selected data as a three-dimensional model of nodes and connections. Embodiments display the first and second mixed-reality objects on a display device, and manipulate one of the first and second mixed-reality objects in response to input received by one or more sensors.

17 Claims, 6 Drawing Sheets

(56) References Cited

U.S. PATENT DOCUMENTS

| | | | | |
|---|---|---|---|---|
| 2012/0249741 A1* | 10/2012 | Maciocci | ............. | G06T 19/006 |
| | | | | 348/51 |
| 2014/0195515 A1* | 7/2014 | Baker | .................... | G06F 16/26 |
| | | | | 707/722 |
| 2014/0279824 A1* | 9/2014 | Tamayo | ............. | G06F 16/2428 |
| | | | | 707/600 |
| 2016/0217405 A1* | 7/2016 | Steinbach | ........ | G06Q 10/06315 |

* cited by examiner

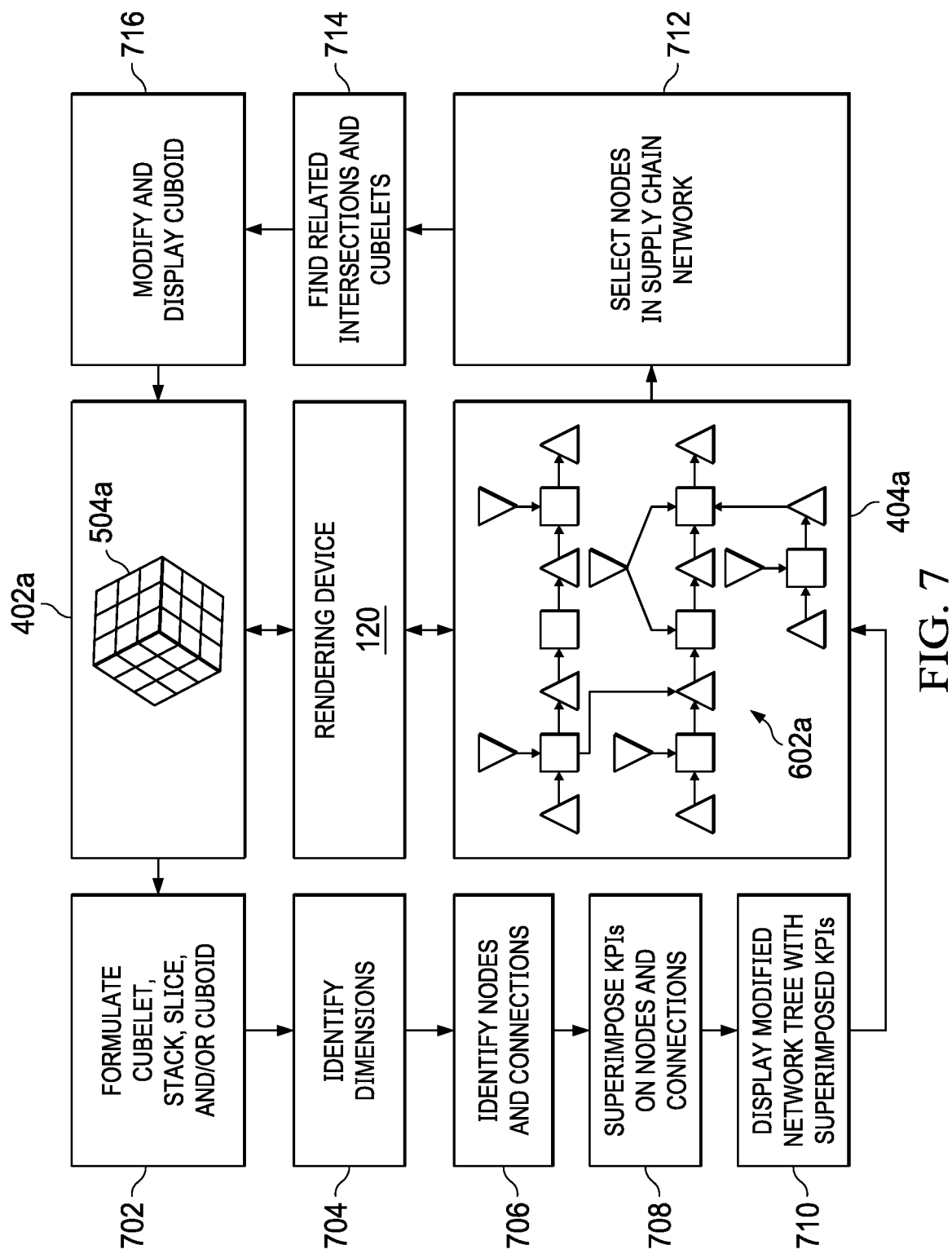

SYNCHRONIZED ANALYSIS OF MIXED-REALITY OLAP AND SUPPLY CHAIN NETWORK VISUALIZATIONS

CROSS-REFERENCE TO RELATED APPLICATIONS

The present disclosure is related to that disclosed in the U.S. Provisional Application No. 62/972,214, filed Feb. 10, 2020, entitled "Synchronized Analysis of Mixed-Reality OLAP and Supply Chain Network Visualizations." U.S. Provisional Application No. 62/972,214 is assigned to the assignee of the present application. The subject matter disclosed in U.S. Provisional Application No. 62/972,214 is hereby incorporated by reference into the present disclosure as if fully set forth herein. The present invention hereby claims priority under 35 U.S.C. § 119(e) to U.S. Provisional Application No. 62/972,214.

TECHNICAL FIELD

The present disclosure relates generally to supply chain planning and specifically to mixed-reality-based sensory feedback and graphical representations and manipulations of supply chain monitoring and analysis.

BACKGROUND

Existing database systems may display database data using one or more display programs, such as, for example, Microsoft Excel. However, interacting with vast sums of database data using existing interfaces may require significant time investment and the study of hundreds or thousands of individual cells of data to derive meaningful data interpretation or to detect data trends. Data display and visualization systems that (1) require a high degree of training to learn to operate, (2) demand time-consuming granular review in order to accomplish meaningful data analysis, or (3) do not display data using complementary visual representations to assist data interpretation and analysis, may be undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates the mixed-reality visualization system altering a three-dimensional cuboid in response to input received to a network tree, and altering the network tree in response to input received to the three-dimensional cuboid, according to an embodiment.

DETAILED DESCRIPTION

Figure 1:
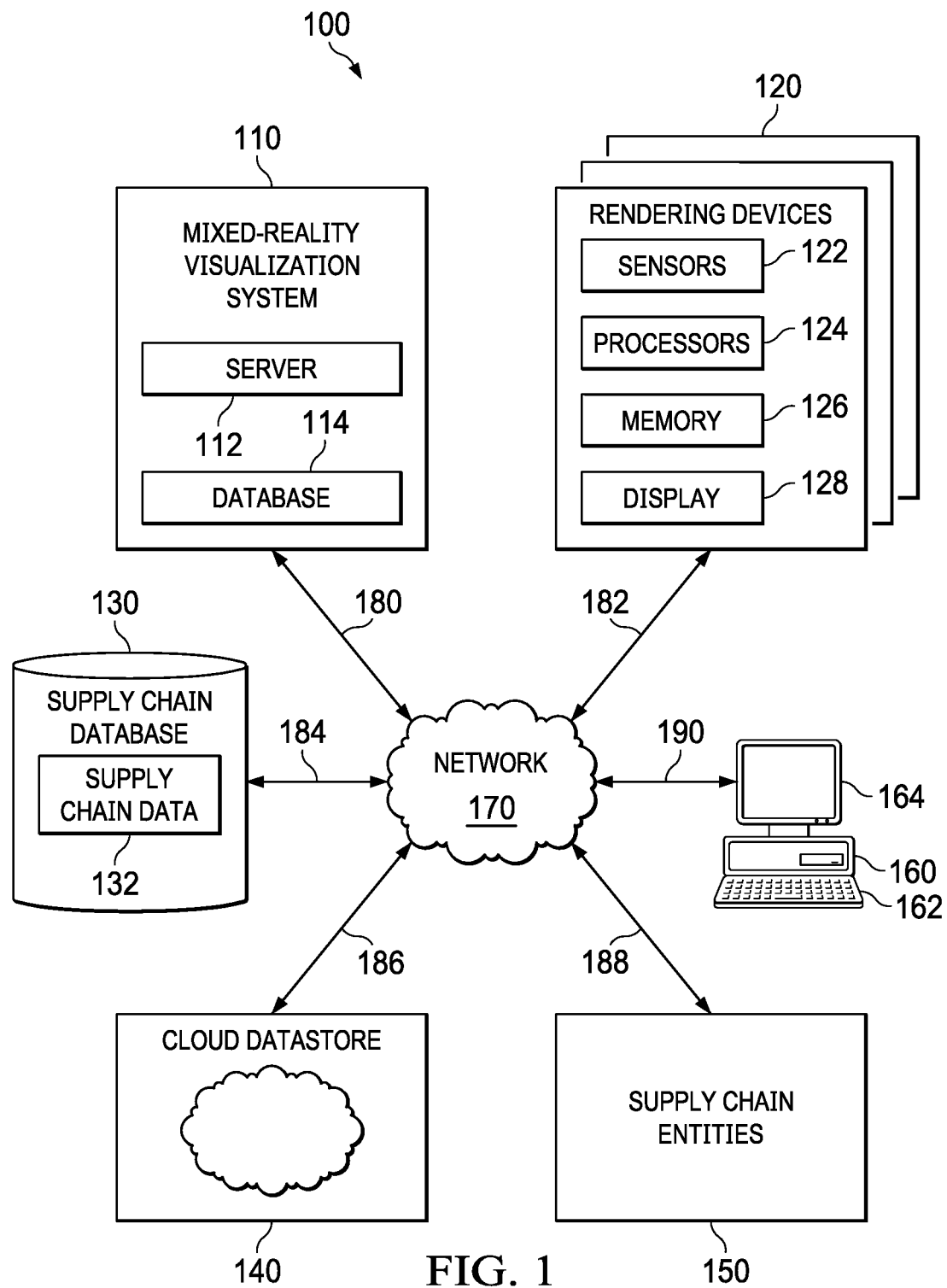
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in greater detail below, embodiments of the following disclosure provide a mixed-reality visualization system and method that generates and manipulates one or more mixed-reality online analytical processing (OLAP) cuboid visualizations and one or more supply chain network visualizations simultaneously. In an embodiment, the mixed-reality cuboid visualization may display database data comprising one or more selectable key process indicators (KPIs) according to one or more selectable dimensions (such as, for example, products sold, facilities at which products are sold, or time periods in which products are sold). In an embodiment, the mixed-reality supply chain network visualization may display one or more components of a supply chain network in the form of a rotatable three-dimensional model of nodes and connections.

The mixed-reality visualization system and method may include one or more rendering devices that display mixed-reality cuboid visualizations and mixed-reality supply chain network visualizations in virtual space, permitting one or more rendering devices, and/or one or more computers, to interact with the mixed-reality cuboid visualizations, to rotate, expand, compress, slice, dice, stack, or otherwise alter the mixed-reality cuboid visualization and the data visualized by the mixed-reality cuboid visualization, and to interact with, rotate, and modify the mixed-reality supply chain network visualizations. In response to the interactions of one or more rendering devices and/or computers with the mixed-reality cuboid visualizations and/or supply chain network visualizations, the mixed-reality visualization system and method may access additional data stored in one or more databases, and may incorporate the additional data, and one or more additional KPIs and/or dimensions associated with the additional data, into the mixed-reality cuboid visualizations and/or supply chain network visualizations. The mixed-reality visualization system and method may also generate revised mixed-reality supply chain network visualizations in response to modifications made to the mixed-reality cuboid visualization, and may generate revised mixed-reality cuboid visualizations in response to modifications made to the mixed-reality supply chain network visualizations.

Embodiments of the following disclosure enable one or more rendering devices and/or one or more computers to interact with, manipulate, and call up large volumes of data swiftly and efficiently. Embodiments permit the visualization of data according to selectable KPIs and dimensions, and may represent patterns, trends, or other relationships using color-coded mixed-reality cuboid visualizations and mixed-reality supply chain network visualizations. The mixed-reality cuboid visualizations and mixed-reality supply chain network visualizations may assist in the identification of, and the initiating of action in response to, apparent or obscure patterns or trends in database data in a streamlined and efficient fashion. According to embodiments, the mixed-reality visualization system and method may enhance data analysis by simultaneously generating mixed-reality cuboid visualizations and mixed-reality supply chain network visualizations to display and configure data in complementary visual representations.

FIG. 1 illustrates exemplary supply chain network 100, in accordance with a first embodiment. Supply chain network 100 comprises mixed-reality visualization system 110, one or more rendering devices 120, supply chain database 130, cloud datastore 140, one or more supply chain entities 150, computer 160, network 170, and communication links 180-190. Although single mixed-reality visualization system 110, one or more rendering devices 120, single supply chain database 130, single cloud datastore 140, one or more supply chain entities 150, single computer 160, and single network 170 are shown and described, embodiments contemplate any number of mixed-reality visualization systems 110, any number of rendering devices 120, any number of supply chain entities 150, any number of supply chain databases 130, any number of cloud datastores 140, any number of computers 160, or any number of networks 170, according to particular needs.

Mixed-reality visualization system 110 comprises server 112 and database 114. Server 112 of mixed-reality visualization system 110 comprises one or more modules that generate a mixed-reality environment displaying interactive three-dimensional visualizations for supply chain management (including but not limited to strategic planning and master planning), physicalization of supply chain planning problems, identifying and solving supply chain problems, viewing key process indicators (KPIs) and other supply chain metrics and parameters, and navigation of a global supply chain network. Embodiments of the following mixed-reality visualization system 110 interface with one or more rendering devices 120 to process, render, and display the mixed-reality environment and representations of supply chain network 100. According to further embodiments, mixed-reality visualization system 110 and one or more rendering devices 120 generate a visualization of, among other things, supply and demand, distribution networks 170, supply chain analytics, supply chain alerts, and KPIs, which may be conveyed to the user via one or more rendering devices 120 using visual and/or aural indicators. Mixed-reality visualization system 110 receives and processes data from one or more rendering devices 120, supply chain database 130, cloud datastore 140, and/or one or more supply chain entities 150 and stores the data in database 114.

Figure 2:
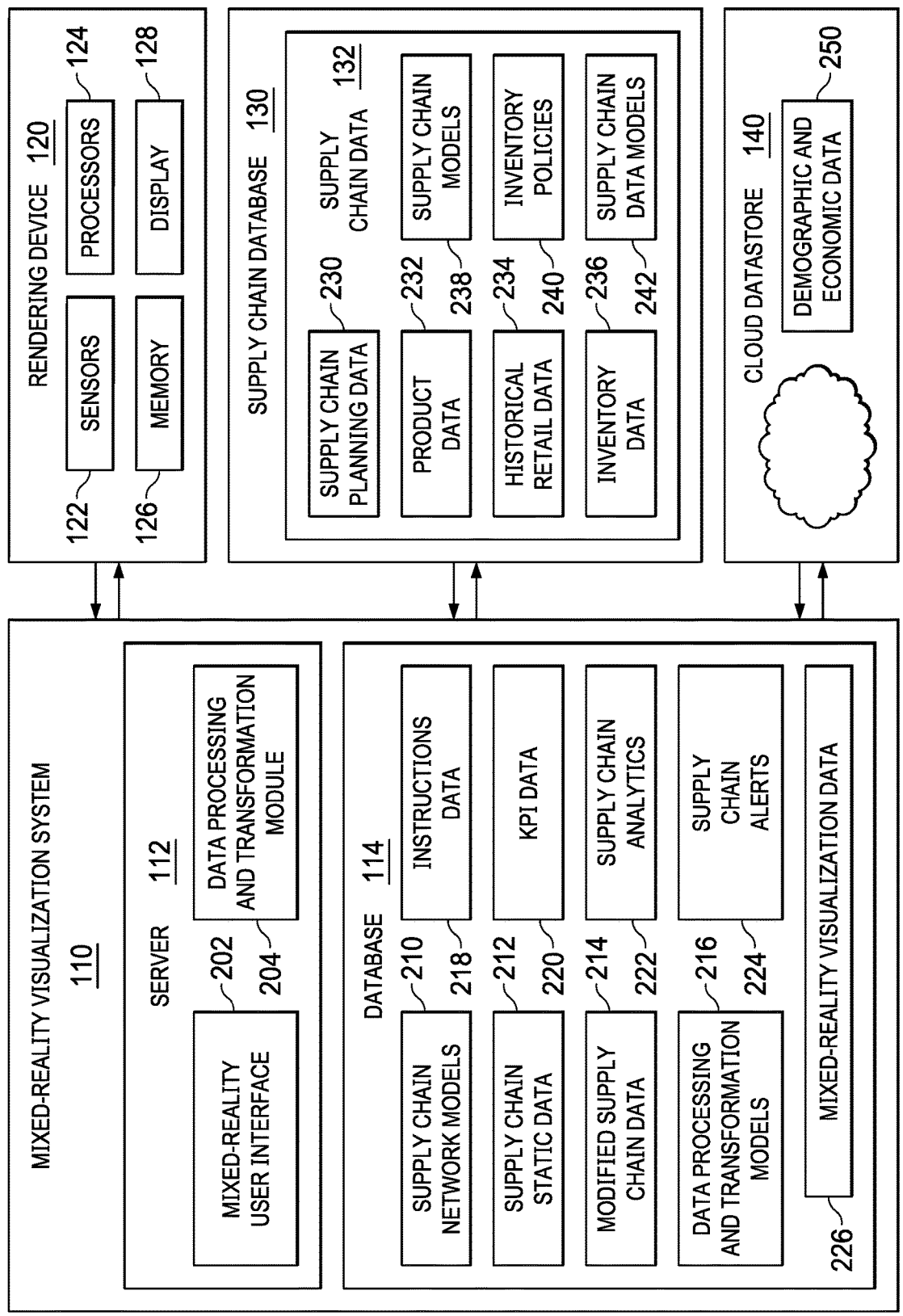
FIG. 2 illustrates the mixed-reality visualization system, one or more rendering devices, supply chain database, and cloud datastore of FIG. 1 in greater detail, in accordance with an embodiment.

According to embodiments, one or more rendering devices 120 comprise one or more electronic devices that display mixed-reality visualizations for navigating and interacting with supply chain network 100 and supply chain analytics 222 stored in mixed-reality visualization system 110 database 114 (illustrated by FIG. 2). One or more rendering devices 120 may comprise, for example, a mixed-reality headset, a head-mounted display, a smartphone, a tablet computer, a mobile device, a projector, or like devices. One or more rendering devices 120 comprise one or more sensors 122, one or more processors 124, memory 126, one or more displays 128, and may include an input device, output device, and a fixed or removable computer-readable storage media. One or more sensors 122 may comprise an imaging sensor, such as, for example, a camera module, a light detection and ranging (LIDAR) device, radar device, infrared light sensor, ambient light sensor, or other electronic sensor. According to an embodiment, one or more sensors 122 detect the head movement, the field of vision, and the gaze of a user of one or more rendering devices 120. One or more processors 124 and associated memory 126 execute instructions and manipulate information according to the operation of mixed-reality visualization system 110 and any of the methods described herein. Display 128 of one or more rendering devices 120 displays visual information, such as, for example, feedback, analysis, data, images or graphics using mixed-reality visualizations. For example, display 128 may superimpose graphics, colors, text, or other renderings of supply chain data 132 over or in connection with a virtual visualization of a cuboid comprised of cubelets, or of supply chain network visualization comprised of nodes and connections. Using one or more rendering devices 120, a user may interact with the rendered visualizations using speech, eye movement, and/or spoken instructions to interact with and modify supply chain network 100. Mixed-reality visualization system 110, in connection with one or more rendering devices 120, comprises a system to visualize supply chain processes and supply chain analytics 222 for improved real-time interaction. One or more rendering devices 120 may include fixed or removable computer-readable storage media, including a non-transitory computer readable medium, magnetic computer disks, flash drives, CD-ROM, in-memory devices or other suitable media to receive output from and provide input to mixed-reality visualization system 110.

Supply chain database 130 stores supply chain data 132 received from one or more supply chain entities 150. In one embodiment supply chain database 130 stores supply chain data 132 received from a manufacturing supply chain, such as, for example, data received from a demand planning system, inventory optimization system, supply planning system, order promising system, factory planning and sequencing system, and sales and operations planning system. In an embodiment in which supply chain network 100 comprises a retail supply chain, supply chain database 130 stores supply chain data 132 received from one or more retail supply chain planning and execution systems such as, for example, historical sales data, retail transaction data, store characteristic data, and data received from a demand planning system, assortment optimization system, category management system, transportation management system, labor management system, and warehouse management system. Although particular planning and execution systems of particular types of supply chain networks 100 are shown and described, embodiments contemplate supply chain database 130 storing data received from planning and execution systems for any type of supply chain network 100 and data received from one or more locations local to, or remote from, supply chain network 100, such as, for example, social media data, weather data, social trends, and the like.

Figure 5:
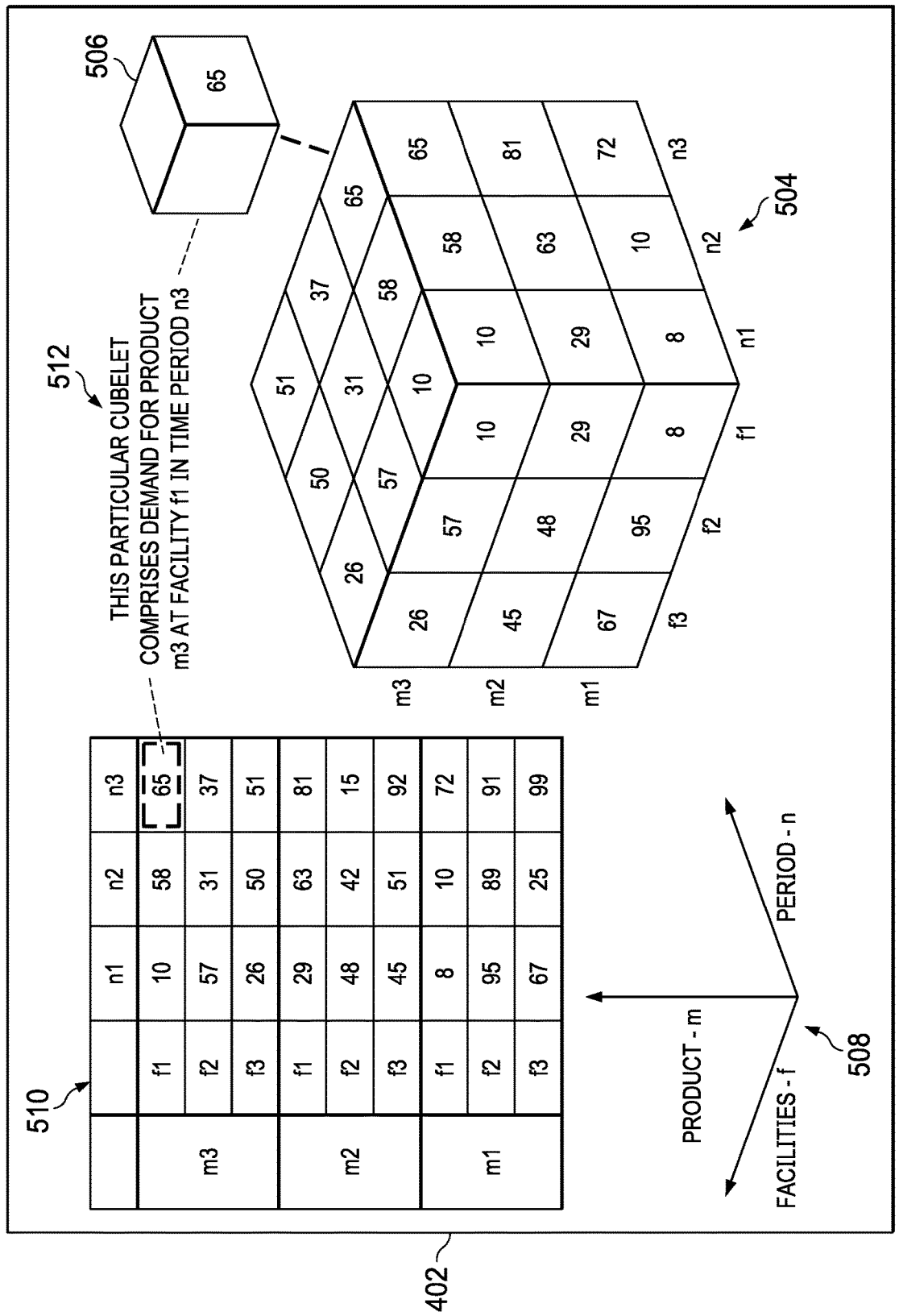
FIG. 5 illustrates an exemplary mixed-reality cuboid visualization display in greater detail, according to an embodiment.
Figure 6:
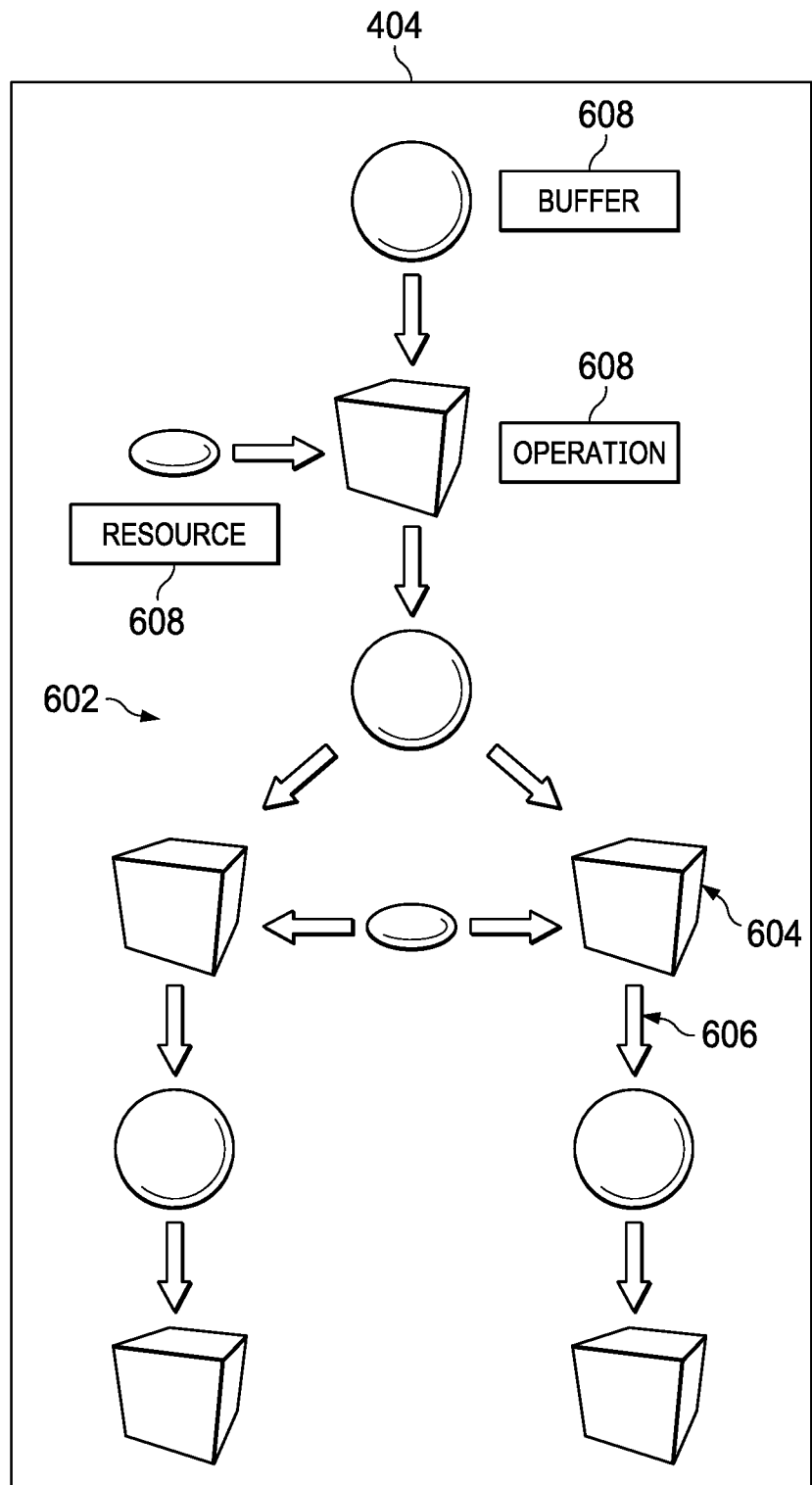
FIG. 6 illustrates an exemplary mixed-reality supply chain network visualization display in greater detail, according to an embodiment.

Cloud datastore 140 receives and stores demographic and economic data 250, which may be accessed by mixed-reality visualization system 110 and mapped to one or more mixed-reality cuboid visualizations, best illustrated by FIG. 5, and/or one or more mixed-reality supply chain network visualizations, best illustrated by FIG. 6. Although cloud datastore 140 is illustrated and described as comprising demographic and economic data, embodiments contemplate cloud datastore 140 storing any type of data received from any one or more locations local to, or remote from, supply chain network 100.

Mixed-reality visualization system 110, one or more rendering devices 120, supply chain database 130, cloud datastore 140, and one or more supply chain entities 150 may operate on one or more computers 160 that are integral to or separate from the hardware and/or software that support that mixed-reality visualization system 110, one or more rendering devices 120, supply chain database 130, cloud datastore 140, and one or more supply chain entities 150. Computers 160 may include any suitable input device 162, such as a keypad, mouse, touch screen, joystick, navigation control device, microphone, or other device to input information to mixed-reality visualization system 110, one or more rendering devices 120, supply chain database 130, cloud datastore 140, one or more supply chain entities 150, and computer 160. Computers 160 may include output device 164, which may convey information associated with the operation of mixed-reality visualization system 110, including digital or analog data, visual information, or audio information such as, for example, one or more displays, monitors, speakers, headsets, and/or haptics. Computers 160 may include fixed or removable computer-readable storage media, including a non-transitory computer readable medium, magnetic computer disks, flash drives, CD-ROM, in-memory devices or other suitable media to receive output from and provide input to mixed-reality visualization system 110. Computers 160 may include one or more processors 124 and associated memory 126 to execute instructions and manipulate information according to the operation of mixed-reality visualization system 110 and any of the methods described herein. In addition, or as an alternative, embodiments contemplate executing the instructions on computers 160 that cause computers 160 to perform functions of the method. Further examples may also include articles of manufacture including tangible computer-readable media that have computer-readable instructions encoded thereon, and the instructions may comprise instructions to perform functions of the methods described herein.

Although single computer 160 is illustrated in FIG. 1, mixed-reality visualization system 110, one or more rendering devices 120, supply chain database 130, cloud datastore 140, and one or more supply chain entities 150 may each operate on separate computers 160 or may operate on one or more shared computers 160. Each of one or more computers 160 may be a work station, personal computer (PC), network computer, notebook computer, tablet, personal digital assistant (PDA), cell phone, telephone, wireless data port, mobile device, or any other suitable computing device. In an embodiment, one or more users may be associated with mixed-reality visualization system 110. These one or more users may include, for example, a "manager" or a "planner" handling inventory planning, packing, and/or shipping for items of one or more supply chain entities 150 based, at least in part, on altered parameters received from mixed-reality visualization system 110 in response to a user input and/or one or more related tasks within supply chain network 100. In addition, or as an alternative, these one or more users within supply chain network 100 may include, for example, one or more computers 160 programmed to autonomously handle, among other things, one or more supply chain processes such as demand planning, supply and distribution planning, inventory management, allocation planning, and/or order fulfilment.

In one embodiment, one or more supply chain entities 150 represent one or more supply chain networks, including, for example, one or more enterprises, and may comprise one or more suppliers, manufacturers, distribution centers, retailers, and/or customers. A supplier may be any suitable entity that offers to sell or otherwise provides one or more items (i.e., materials, components, or products) to one or more manufacturers. Items may comprise, for example, parts or supplies used to generate products. An item may comprise a part of the product, or an item may comprise a supply that is used to manufacture the product, but does not become a part of the product, for example, a tool, energy, or resource. According to some embodiments, items comprise foods or ingredients. According to other embodiments, items and products may each receive a Universal Product Code (UPC), RFID tag, or barcode that identifies (including uniquely identifying) the item or product. Such suppliers may comprise automated distribution systems that automatically transport products to one or more manufacturers based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

A manufacturer may be any suitable entity that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, retailer, a customer, or any other suitable entity. Such manufacturers may comprise automated robotic production machinery that produce products based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

A distribution center may be any suitable entity that offers to store or otherwise distributes at least one product to one or more retailers and/or customers. A distribution center may, for example, receive a product from another entity in supply chain network 100 and store and transport the product for another supply chain entity. Such distribution centers may comprise automated warehousing systems that automatically remove products from and place products into inventory based, at least in part, on one or more altered parameters received from mixed-reality visualization system 110 in response to a user input, such as, for example an instruction to increase capacity at one or more supply chain locations, altering demand or supply levels at one or more supply chain entities 150, or other interactions described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

Although one or more supply chain entities 150 are shown and described as separate and distinct entities, the same entity may simultaneously act as any other of one or more supply chain entities 150. For example, one or more supply chain entities 150 acting as a manufacturer may produce a product, and the same entity may then act as a supplier to supply an item to itself or another supply chain entity. Although one example of supply chain network 100 is shown and described, embodiments contemplate any suitable supply chain network 100, according to particular needs.

In one embodiment, mixed-reality visualization system 110, one or more rendering devices 120, supply chain database 130, cloud datastore 140, one or more supply chain entities 150, and one or more computers 160 are coupled with network 170 using communication links 180-190, which may be any wireline, wireless, or other link suitable to support data communications between mixed-reality visualization system 110, one or more rendering devices 120, supply chain database 130, cloud datastore 140, one or more supply chain entities 150, and one or more computers 160 and network 170 during operation of supply chain network 100. Although communication links 180-190 are shown as generally coupling mixed-reality visualization system 110, one or more rendering devices 120, supply chain database 130, cloud datastore 140, one or more supply chain entities 150, and computer 160 with network 170, mixed-reality visualization system 110, one or more rendering devices 120, one or more supply chain databases 130, one or more cloud datastores 140, one or more supply chain entities 150, and computers 160 may communicate directly with mixed-reality visualization system 110, one or more rendering devices 120, supply chain database 130, cloud datastore 140, one or more supply chain entities 150, and computer 160, according to particular needs.

In other embodiments, network 170 includes the Internet and any appropriate local area networks (LANs), metropolitan area networks (MANs), or wide area networks (WANs) coupling mixed-reality visualization system 110, one or more rendering devices 120, supply chain database 130, cloud datastore 140, one or more supply chain entities 150, and computers 160. For example, data may be maintained by mixed-reality visualization system 110 at one or more locations external to mixed-reality visualization system 110, one or more rendering devices 120, supply chain database 130, cloud datastore 140, one or more supply chain entities 150, and computers 160 and made available to one or more associated users of mixed-reality visualization system 110, one or more rendering devices 120, supply chain database 130, cloud datastore 140, one or more supply chain entities 150, and computers 160 using network 170 or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, mixed-reality visualization system 110 may generate an inventory plan, packing plan, or shipping plan for the items of one or more supply chain entities 150 in supply chain network 100 based, at least in part, on altered parameters received from mixed-reality visualization system 110 in response to a user input, such as, for example, an instruction to increase capacity at one or more supply chain locations, altering demand or supply levels at one or more supply chain entities 150, siting a warehouse or distribution center for a potential demand region, or other interactions described herein. Furthermore, mixed-reality visualization system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more generated inventory plans, packing plans, or shipping plans and/or current inventory or production levels. For example, the methods described herein may include computers 160 receiving product data from automated machinery having at least one sensor and product data corresponding to an item detected by the automated machinery. The received product data may include an image of the item, an identifier, as described above, and/or other product data associated with the item (dimensions, texture, estimated weight, and any other like data). The method may further include computers 160 looking up received product data in a database system associated with mixed-reality visualization system 110 to identify the item corresponding to the product data received from the automated machinery.

Computers 160 may also receive, from the automated machinery, a current location of the identified item. Based on the identification of the item, computers 160 may also identify (or alternatively generate) a first mapping in a database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to one or more rendering devices 120 or automated machinery based, as least in part, on one or more differences between the first mapping and the second mapping such as, for example, to locate items to add to or remove from an inventory, container, or package for one or more supply chain entities 150.

According to these embodiments, mixed-reality visualization system 110 may determine a difference between current inventory levels and the inventory reorder points for one or more items in an inventory. Based on the difference, mixed-reality visualization system 110 may instruct the automated machinery to add items to a shipment in an amount equal to the inventory target quantities minus the difference between current inventory levels and the inventory reorder points. For example, mixed-reality visualization system 110 may determine an inventory plan, packing plan, or shipping plan based on forecasted demand, current inventory levels, forecasted production levels, item attributes, pack constraints, store constraints, and the like. Based on these factors and constraints, mixed-reality visualization system 110 generates instructions, feedback, and a visualization of supply chain network 100 via one or more rendering devices 120.

FIG. 2 illustrates mixed-reality visualization system 110, one or more rendering devices 120, supply chain database 130, and cloud datastore 140 of FIG. 1 in greater detail, in accordance with an embodiment. As described above, mixed-reality visualization system 110 comprises server 112 and database 114. Although mixed-reality visualization system 110 is illustrated and described as comprising single server 112 and single database 114, embodiments contemplate any number of servers 112 or databases 114 internal to, or externally coupled with, mixed-reality visualization system 110, according to particular needs.

Database 114 of mixed-reality visualization system 110 comprises supply chain network models 210, supply chain static data 212, modified supply chain data 214, data processing and transformation models 216, instructions data 218, KPI data 220, supply chain analytics 222, supply chain alerts 224, and mixed-reality visualization data 226. Although database 114 is shown and described as comprising supply chain network models 210, supply chain static data 212, modified supply chain data 214, data processing and transformation models 216, instructions data 218, KPI data 220, supply chain analytics 222, supply chain alerts 224, and mixed-reality visualization data 226, embodiments contemplate any number or combination of data stored at one or more locations local to, or remote from, mixed-reality visualization system 110, such as on multiple servers 112 or computers 160 at any location in supply chain network 100.

According to embodiments, mixed-reality visualization system 110 uses one or more supply chain network models 210 to display supply chain static data 212, modified supply chain data 214, and/or supply chain database 130 data and/or cloud datastore 140 data by simultaneous mixed-reality cuboid visualization and mixed-reality supply chain network visualization, described in greater detail below. In addition, mixed-reality visualization system 110 utilizes one or more supply chain network models 210 to process modified supply chain data 214 generated by one or more rendering devices 120 in response to and based, at least in part, on one or more user interactions with mixed-reality user interface 202 such as, for example, physical, visual, and voice inputs and feedback, which may be stored as instructions data 218. According to embodiments, supply chain network models 210 may store and/or comprise any data related to one or more mixed-reality cuboid visualizations and/or one or more mixed-reality supply chain network visualizations, including but not limited to one or more selected data tables, KPIs, dimensions, and color schemes.

In addition, mixed-reality visualization system 110 uses one or more data processing and transformation models 216 (which may include, for example, one or more heuristic models) to generate KPIs (which may be stored as KPI data 220) for mapping to a mixed-reality cuboid visualization and/or a mixed-reality supply chain visualization, and to receive input and other instructions generated by one or more rendering devices 120, such as for example, one or more user interactions with mixed-reality user interface 202 such as, for example, physical, visual, and voice inputs and feedback, which may be stored as instructions data 218.

KPI data 220 may comprise the aggregated values of input or output fields for records in different tables. KPIs may also comprise the optimal values of one or more variables as received in response to formulating the constraints and objectives or solving a mixed-integer linear programming problem.

Supply chain analytics 222 comprise input data, output data, and/or values of various objectives which may be displayed at a detailed level or aggregated over one or more dimensions. Embodiments of mixed-reality visualization system 110 contemplate supply chain analytics 222 comprising answers displayed by mixed-reality visualization system 110 in response to simple or complex queries. By way of example only and not by limitation, mixed-reality visualization system 110 may receive a query spoken by a user, such as, for example, "Show me a three-dimensional representation of products sold at Facility 1 from October-December 2019." In response to the received query, mixed-reality visualization system 110 may generate or alter a mixed-reality cuboid visualization to display a cuboid representing products sold at Facility 1 from October-December 2019.

According to embodiments, mixed-reality visualization system 110 provides for monitoring one or more supply chain processes, detecting an exception or problem condition (such as, for example, a KPI that is outside of a predetermined threshold), and generating one or more supply chain alerts 224. Supply chain alerts 224 may comprise changing the color, size, or other properties of mapped features (such as, for example, one or more nodes of supply chain network 100) as well as any type of visual, auditory, or haptic cues. Mixed-reality visualization data 226 may store one or more mixed-reality cuboid visualizations and/or one or more mixed-reality supply chain network visualizations generated by mixed-reality user interface 202.

Server 112 of mixed-reality visualization system 110 comprises mixed-reality user interface 202 and data processing and transformation module 204. Although server 112 is shown and described as comprising a single mixed-reality user interface 202 and a single data processing and transformation module 204, embodiments contemplate any suitable number or combination of mixed-reality user interfaces 202 and data processing and transformation modules 204 located at one or more locations, local to, or remote from mixed-reality visualization system 110, such as on multiple servers 112 or computers 160 at any location in supply chain network 100.

Mixed-reality user interface 202 generates and modifies (1) a mixed-reality cuboid visualization comprising a manipulable multi-dimensional cuboid, comprised of individual cubelets representing selectable aspects of supply chain data 132 (such as, for example, a particular product-location-time period combination that comprises the number of products sold at a particular location on a particular day), that displays one or more parameters of supply chain network 100; and (2) a mixed-reality supply chain network visualization comprising a three-dimensional model of nodes and connections representing components of supply chain network 100. Mixed-reality user interface 202 may provide for the navigation (such as, for example, zooming in and out, rotation, internal or external viewing, and the like) and manipulation (such as, for example, expanding, compressing, aggregating, slicing and dicing) of the mixed-reality cuboid visualization, and the navigation and manipulation of the mixed-reality supply chain network visualization, by receiving physical, visual, and voice input from one or more rendering devices 120. In addition, mixed-reality user interface 202 generates interactive displayed data in the form of mixed-reality cuboid visualizations and mixed-reality supply chain network visualizations (such as, for example, nodes of supply chain network 100, supply chain metrics and parameters, and the like) by receiving input from one or more rendering devices 120.

Mixed-reality user interface 202 may model one or more supply chain planning problems (such as, for example, an inventory planning problem, a master planning problem, and the like), identify resources, operations, buffers, and pathways, and map supply chain network 100 using supply chain network models 210 and/or supply chain data models 242.

According to embodiments, data processing and transformation module 204 modifies supply chain data 132 in response to receiving input or instructions from one or more rendering devices 120. According to one embodiment, data processing and transformation module 204 generates a solution to the supply chain planning problem mapped to the mixed-reality cuboid visualization and/or mixed-reality supply chain network visualization based, at least in part, on input and instructions received from one or more rendering devices 120. As described below, mixed-reality visualization system 110 selects KPIs and other data outputs for display on a mixed-reality cuboid visualization using one or more data processing and transformation modules 204.

One or more rendering devices 120 comprises sensors 122, processors 124, memory 126, and display 128, as described above. According to one embodiment, one or more rendering devices 120 comprise sensors 122 comprising a gaze tracking sensor, hand gesture sensor, and head orientation sensor. According to other embodiments, one or more rendering devices 120 provides a spatial visualization of a mixed-reality cuboid visualization and a mixed-reality supply chain network visualization providing for viewing, hearing, and/or receiving haptics conveying supply chain data 132, KPI data 220, supply chain analytics 222, feedback, and other data through a device such as a mixed-reality headset (for example, the MICROSOFT HOLO-LENS, META 2 or EPSON MOVERIO BT-200 mixed-reality headsets). According to embodiments, one or more rendering devices 120 may receive one or more user inputs for search, navigation, visualization, and supply chain action. Embodiments contemplate a mixed-reality headset that provides user input by one or more of voice tracking, gaze tracking, hand gesture tracking, and incremental discovery (i.e. looking in a direction to discover the related supply chain components). Additionally, one or more sensors 122 of one or more rendering devices 120 may be located at one or more locations local to, or remote from, one or more rendering devices 120, including, for example, one or more sensors 122 integrated into one or more rendering devices 120 or one or more sensors 122 remotely located from, but communicatively coupled with, one or more rendering devices 120. As described above, one or more rendering devices 120 may include one or more processors 124 and associated memory 126 to execute instructions and manipulate information according to the operation of mixed-reality visualization system 110 and any of the methods described herein.

For example, a user may navigate mixed-reality user interface 202 by speaking a command (such as, for example, "show me the location with the highest shortage" or other like command), by gazing or staring at a particular supply chain network 100 component (such as, for example, staring at a location causes mixed-reality visualization system 110 to alter the color of a visual element to illustrate the amount of demand satisfaction at a node at, or near to, the location), and/or by tracking movements of a hand, finger, or arm of a user (such as, for example, tapping on a mixed-reality surface displayed by one or more rendering devices 120 such as, for example, a graphic representing an end item, causes mixed-reality visualization system 110 to render and/or display a graphic representing the raw-material that is consumed by production of the end item).

Display 128 of one or more rendering devices 120 may comprise for example, a projector, a monitor, an LCD panel, or any other suitable electronic display device. Embodiments contemplate one or more rendering devices 120 having more than one display 128, including but not limited to a first display configured to direct an image into a user's left eye (a left eye display) and a second display configured to direct an image into a user's right eye (a right eye display) to provide a mixed-reality visualization by, for example, displaying visual elements on a transparent or translucent medium directly in front of a user's eyes, so that the visual element appears within the visual field of the user. One or more rendering devices 120 display visual elements overlaid on real-world scenes and located based, at least in part, on the calculated visual field of the user. According to embodiments, information may be projected, overlaid, superimposed, or displayed such that the rendered and displayed images, text, and graphics are fixed in a virtual three-dimensional space anchored with a point or object in the environment, in a virtual space, or an orientation of the user or of one or more rendering devices 120. In addition, or as an alternative, display 128 may display a mixed-reality visualization on an opaque display by overlaying one or more visual elements over a visual feed from a camera, and altering the appearance and placement of the visual elements based, at least in part, on the movement of objects within the visual feed of the camera and/or one or more sensors 122. According to some embodiments, mixed-reality visualization system 110 arranges visual indicators representing one or more supply chain entities 150 on the inner or outer surface of a mixed-reality cuboid visualization and/or a mixed-reality supply chain network visualization, based, at least in part, on the field of view of display 128 of one or more rendering devices 120.

As described above, mixed-reality visualization system 110 communicates with one or more external database storage systems such as, for example, supply chain database 130, cloud datastore 140, or one or more other data storage systems local to, or remote from, supply chain network 100.

Supply chain database 130 may comprise one or more databases 114 or other data storage arrangement at one or more locations, local to, or remote from, supply chain network 100. Supply chain database 130 comprises supply chain data 132 including, by way of example only and not of limitation, supply chain planning data 230, product data 232, historical retail data 234, inventory data 236, supply chain models 238, inventory policies 240, and supply chain data models 242. Although supply chain database 130 is shown and described as comprising supply chain planning data 230, product data 232, historical retail data 234, inventory data 236, supply chain models 238, inventory policies 240, and supply chain data models 242, embodiments contemplate any suitable number or combination of these, located at one or more locations, local to, or remote from, supply chain database 130, according to particular needs.

As an example only and not by way of limitation, supply chain database 130 stores supply chain planning data 230, including one or more supply chain planning problems of supply chain network 100 that may be used by mixed-reality visualization system 110. Supply chain planning data 230 may comprise for example, various decision variables, business constraints, goals, and objectives of one or more supply chain entities 150. According to some embodiments, supply chain planning data 230 may comprise hierarchical objectives specified by, for example, business rules, master planning requirements, scheduling constraints, and discrete constraints, including, for example, sequence dependent setup times, lot-sizing, storage, shelf life, and the like.

Product data 232 of supply chain database 130 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 232 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Historical retail data 234 of supply chain database 130 may comprise, for example, any data relating to past sales, past demand, purchase data, promotions, events, or the like of one or more supply chain entities 150. Historical retail data 234 may cover a time interval such as, for example, by the minute, hourly, daily, weekly, monthly, quarterly, yearly, or any suitable time interval, including substantially in real time. According to embodiments, historical retail data 234 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 236 of supply chain database 130 may comprise any data relating to current or projected inventory quantities or states, order rules, or the like. For example, inventory data 236 may comprise the current level of inventory for each item at one or more stocking locations across supply chain network 100. In addition, inventory data 236 may comprise order rules that describe one or more rules or limits on setting an inventory policy, including, but not limited to, a minimum order quantity, a maximum order quantity, a discount, a step-size order quantity, and batch quantity rules. According to some embodiments, mixed-reality visualization system 110 accesses and stores inventory data 236 in supply chain database 130, which may be used by one or more planning and execution systems of one or more supply chain entities 150 to place orders, set inventory levels at one or more stocking points, initiate manufacturing of one or more items (or components of one or more items), or the like. In addition, or as an alternative, inventory data 236 may be updated by receiving current item quantities, mappings, or locations from an inventory system, a transportation network, one or more rendering devices 120, and/or one or more supply chain entities 150.

Supply chain models 238 of supply chain database 130 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 238 may also comprise characteristics that specify the structure of supply chain network 100 in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to a different supply chain model of supply chain models 238.

Inventory policies 240 of supply chain database 130 may comprise any suitable inventory policy describing the reorder point and target quantity, or other inventory policy parameters that set rules for one or more planning and execution systems of one or more supply chain entities 150 to manage and reorder inventory. Inventory policies 240 may be based on target service level, demand, cost, fill rate, or the like. According to embodiments, inventory policies 240 may be used by mixed-reality visualization system 110 to determine a no-stockout probability, fill rate, cost, or other like determination of KPI targets, as described below. According to embodiment, inventory policies 240 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although a particular target service level and percentage is described, embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, one or more planning and execution systems of one or more supply chain entities 150 may determine a replenishment order according to one or more replenishment rules, which, among other things, indicates to one or more supply chain entities 150 to determine or receive inventory to replace the depleted inventory.

Supply chain data models 242 represent the flow of materials through one or more supply chain entities 150 of supply chain network 100. Mixed-reality user interface 202 may model the flow of materials through one or more supply chain entities 150 of supply chain network 100 as one or more supply chain data models 242 comprising network 170 of nodes and edges. The material storage and/or transition units may be modelled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain data models 242 may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100.

Cloud datastore 140 may comprise, in an embodiment, demographic and economic data 250. Demographic and economic data 250 may be maintained in cloud datastore 140 at one or more locations external to mixed-reality visualization system 110 or one or more rendering devices 120 and made available to one or more associated users of mixed-reality visualization system 110 and one or more rendering devices 120 using the cloud or in any other appropriate manner. Demographic and economic data 250 includes, for example, population data, population density, spending potential, per capita disposable income, and the like. Although cloud datastore 140 is shown as comprising demographic and economic data 250, embodiments contemplate any suitable number of this or other data, internal to, or externally coupled with, cloud datastore 140.

Figure 3:
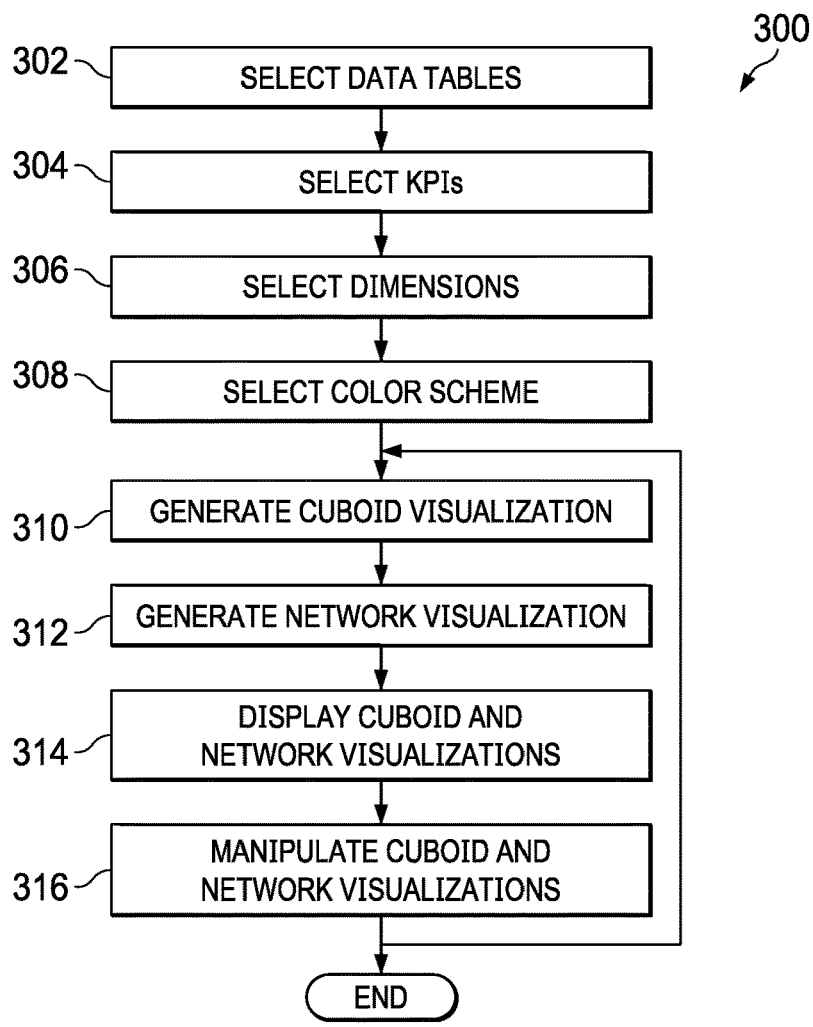
FIG. 3 illustrates an exemplary method of supply chain navigation and analysis using simultaneous mixed-reality cuboid visualizations and mixed-reality supply chain network visualizations with spatial-aural feedback, in accordance with an embodiment.

FIG. 3 illustrates exemplary method 300 of supply chain navigation and analysis using simultaneous mixed-reality cuboid visualizations and mixed-reality supply chain network visualizations with spatial-aural feedback, in accordance with an embodiment. Method 300 proceeds by one or more actions, which, although described in a particular order may be performed in one or more permutations, according to particular needs.

At action 302, data processing and transformation module 204 selects one or more data tables from which to render and visualize supply chain data 132 in simultaneous mixed-reality cuboid visualizations and mixed-reality supply chain network visualizations. Data processing and transformation module 204 may access and select data stored in mixed-reality visualization system 110 database 114 (including but not limited to supply chain static data 212, modified supply chain data 214, supply chain network models 210, data processing and transformation models 216, instructions data 218, KPI data 220, supply chain analytics 222, and supply chain alerts 224), supply chain database 130 (including but not limited to supply chain data 132 and/or supply chain models 238), and/or cloud datastore 140. In an embodiment, one or more rendering devices 120 transmits physical, visual, and/or voice input, such as from one or more users operating one or more rendering devices 120, to data processing and transformation module 204 to select one or more data tables. In other embodiments, data processing and transformation module 204 may select one or more data tables automatically, or may receive input from one or more computers 160 in supply chain network 100 to select one or more data tables. Data processing and transformation module 204 stores the selection of one or more data tables in supply chain network models 210 of mixed-reality visualization system 110 database 114.

At action 304, data processing and transformation module 204 selects one or more KPIs to render and visualize supply chain data 132 in simultaneous mixed-reality cuboid visualizations and mixed-reality supply chain network visualizations. Data processing and transformation module 204 may access and select KPIs stored in mixed-reality visualization system 110 database 114 (including but not limited to KPI data 220), and/or data stored in supply chain database 130 and/or cloud datastore 140. In an embodiment, one or more rendering devices 120 transmits physical, visual, and/or voice input, such as from one or more users operating one or more rendering devices 120, to data processing and transformation module 204 to select one or more KPIs. In other embodiments, data processing and transformation module 204 may select one or more KPIs automatically, or may receive input from one or more computers 160 in supply chain network 100 to select one or more KPIs. Data processing and transformation module 204 stores the selection of one or more KPIs in supply chain network models 210.

At action 306, data processing and transformation module 204 selects the dimensions by which to render and visualize supply chain data 132 in the mixed-reality cuboid visualization component of the simultaneous mixed-reality cuboid visualizations and mixed-reality supply chain network visualizations. The mixed-reality cuboid visualization may display supply chain data 132, such as, for example, product sales, facilities at which products are sold, and sale time periods, as separate dimensional axes, as best illustrated by FIG. 5. In an embodiment, one or more rendering devices 120 transmits physical, visual, and/or voice input, such as from one or more users operating one or more rendering devices 120, to data processing and transformation module 204 to select one or more dimensions. In other embodiments, data processing and transformation module 204 may select one or more dimensions automatically, or may receive input from one or more computers 160 in supply chain network 100 to select one or more dimensions. Data processing and transformation module 204 stores the selection of one or more dimensions in supply chain network models 210.

At action 308, data processing and transformation module 204 selects the display color scheme of the mixed-reality cuboid visualization. The mixed-reality cuboid visualization may use a variety of colors to display and represent supply chain data 132, such as, for example, gray to represent standard product sales and purple, green, or blue to represent abnormal product sales, shipment shortages, and/or other supply chain exceptions. In an embodiment, one or more rendering devices 120 transmits physical, visual, and/or voice input, such as from one or more users operating one or more rendering devices 120, to data processing and transformation module 204 to select a display color scheme. In other embodiments, data processing and transformation module 204 may select one or more display color schemes automatically, or may receive input from one or more computers 160 in supply chain network 100 to select one or more dimensions. Data processing and transformation module 204 stores the selection of one or more display color schemes in supply chain network models 210.

At action 310, mixed-reality user interface 202 generates a mixed-reality cuboid visualization. Mixed-reality user interface 202 accesses the selection of one or more data tables, KPIs, dimensions, and color schemes stored in supply chain network models 210. Mixed-reality user interface 202 accesses data stored in mixed-reality visualization system 110 database 114, supply chain database 130, and/or cloud datastore 140 that corresponds to the selected one or more data tables. Mixed-reality user interface 202 generates a mixed-reality cuboid visualization displaying the selected data tables according to the selected KPIs, dimensions, and color schemes. Mixed-reality user interface 202 stores the generated mixed-reality cuboid visualization in mixed-reality visualization data 226 of mixed-reality visualization system 110 database 114.

At action 312, mixed-reality user interface 202 generates a mixed-reality supply chain network visualization. According to embodiments, mixed-reality user interface 202 accesses supply chain network models 210 stored in mixed-reality visualization system 110 database 114, and/or supply chain models 238 and/or supply chain data models 242 stored in supply chain database 130, that correspond to the selected one or more data tables. Mixed-reality user interface 202 generates a mixed-reality supply chain network visualization displaying one or more components of supply chain network 100 in the form of a rotatable and manipulable three-dimensional model of nodes and connections. Mixed-reality user interface 202 stores the generated mixed-reality supply chain network visualization in mixed-reality visualization data 226 of mixed-reality visualization system 110 database 114.

At action 314, mixed-reality visualization system 110 and rendering device 120 displays the generated mixed-reality cuboid visualization and mixed-reality supply chain network visualization. Data processing and transformation module 204 accesses the mixed-reality cuboid visualization and mixed-reality supply chain network visualization stored in mixed-reality visualization data 226. Data processing and transformation module 204 transmits the mixed-reality cuboid visualization and mixed-reality supply chain network visualization to memory 126 of rendering device 120. Rendering device 120 accesses the mixed-reality cuboid visualization and mixed-reality supply chain network visualization stored in memory 126 and displays the mixed-reality cuboid visualization and mixed-reality supply chain network visualization on rendering device 120 display.

At an action 316, mixed-reality visualization system 110 manipulates the mixed-reality cuboid visualization and mixed-reality supply chain network visualization in response to input received by rendering device 120. Rendering device 120 sensors 122 detect physical, visual, and/or voice input, such as from a user operating rendering device 120. Rendering device 120 processors 124 transmit the physical, visual, and/or voice input to mixed-reality user interface 202 of mixed-reality visualization system 110 server 112. In response to the physical, visual, and/or voice input, mixed-reality user interface 202 manipulates the mixed-reality cuboid visualization and/or the mixed-reality supply chain network visualization. According to embodiments, manipulations to the mixed-reality cuboid visualization may include, for example, rotating the mixed-reality cuboid in virtual mixed-reality space, compressing the mixed-reality cuboid, expanding the mixed-reality cuboid, slicing the mixed-reality cuboid into slices or stacks of smaller cubelets to display different aspects of supply chain data 132, and/or manipulating intersections between slices and/or stacks.

According to embodiments, manipulations to the mixed-reality supply chain network visualization may include, for example, rotating the mixed-reality supply chain network visualization in virtual mixed-reality space, highlighting or shadowing one or more supply chain nodes and connections to illustrate the movement of one or more products, resources, demands, or other shipments through supply chain network 100, zooming in or out to emphasize different sections of supply chain network 100, and the like. In response to such manipulations, mixed-reality visualization system 110 may generate and display updated, modified, altered, and/or revised mixed-reality cuboid visualizations. According to embodiments, and as described in greater detail below, rendering device 120 and/or one or more computers 160 may, in response to user input, alter one or more variables or data displayed by the mixed-reality cuboid visualization and/or the mixed-reality supply chain network visualization. Mixed-reality visualization system 110 may store the altered one or more variables or data in modified supply chain data 214 of mixed-reality visualization system 110 database 114, and may generate one or more revised mixed-reality cuboid visualizations and/or supply chain network visualizations displaying the altered one or more variables or data. Mixed-reality visualization system 110 may continuously update both the mixed-reality cuboid visualization and the mixed-reality supply chain network visualization in response to input detected by rendering device 120 sensors 122, and may, for example, implement changes made to the mixed-reality cuboid visualization on the mixed-reality supply chain network visualization, and vice versa. Mixed-reality visualization system 110 may then terminate method 300 if rendering device 120 receives no further input.

The following example illustrates the operation of mixed-reality visualization system 110 generating and manipulating simultaneous mixed-reality cuboid visualizations and mixed-reality supply chain network visualizations. In this example, mixed-reality visualization system 110 executes the actions of method 300 to (1) select parameters from which to generate a mixed-reality cuboid visualization and mixed-reality supply chain network visualization, (2) generate a mixed-reality cuboid visualization and mixed-reality supply chain network visualization, (3) display the mixed-reality cuboid visualization and mixed-reality supply chain network visualization simultaneously, and (4) manipulate the mixed-reality cuboid visualization and mixed-reality supply chain network visualization in response to input received by rendering device 120 sensors 122. Although particular examples of mixed-reality visualization system 110 actions are illustrated and described herein, embodiments contemplate mixed-reality visualization system 110 generating and manipulating mixed-reality cuboid visualizations and mixed-reality supply chain network visualizations in any configuration, according to particular needs.

In this example, at action 302, data processing and transformation module 204 selects a "Product/Facility/Time Period" data table, stored in historical retail data 234 of supply chain database 130, from which to render and visualize supply chain data 132 in a simultaneous mixed-reality cuboid visualization and mixed-reality supply chain network visualization. In this example, the "Product/Facility/Time Period" data table stores sales data relating to the sales of several products at multiple separate facilities over three separate time periods. In other embodiments, data processing and transformation module 204 may select and access any data tables stored at any location in supply chain network 100. In this example, rendering device 120 transmits voice input, in the form of a user stating "Access the 'Product/Facility/Time Period' data table," to data processing and transformation module 204 to select a data table at action 302. Data processing and transformation module 204 stores the selection of the "Product/Facility/Time Period" data table in supply chain network models 210 of mixed-reality visualization system 110 database 114. In other embodiments, one or more rendering devices 120 may transmit physical, visual, and/or voice input, to data processing and transformation module 204 to select one or more data tables, data processing and transformation module 204 may select one or more data tables automatically, or data processing and transformation module 204 may receive input from one or more computers 160 in supply chain network 100 to select one or more data tables.

Continuing the example, and at action 304, data processing and transformation module 204 selects, as the relevant KPI to display on the mixed-reality cuboid visualization, "product sales at various facilities over time." As illustrated by FIG. 5, the selection of the "product sales at various facilities over time" KPI enables mixed-reality visualization system 110 to display virtual cuboids comprised of individual product-facility-time period sales data cubelets. Data processing and transformation module 204 stores the selection of the "product sales at various facilities over time" KPI in supply chain network models 210.

Continuing the example, and at action 306, data processing and transformation module 204 selects three dimensions ("products," "facilities," and "time periods") by which to render and visualize the "Product/Facility/Time Period" data table in a mixed-reality cuboid visualization. Data processing and transformation module 204 stores the selection of the "products," "facilities," and "time periods" dimensions in supply chain network models 210. At action 308, data processing and transformation module 204 selects a gray and blue color scheme, in which shades of gray indicate individual cubelets and blue indicates a particular cubelet currently selected by mixed-reality user interface 202, and stores the gray and blue color scheme in supply chain network models 210.

Continuing the example, and at action 310, mixed-reality user interface 202 generates a "Product/Facility/Time Period" mixed-reality cuboid visualization. Mixed-reality user interface 202 accesses the selection of the "Product/Facility/Time Period" data table, the "product sales at various facilities over time" KPI, the "products," "facilities," and "time periods" dimensions, and the gray and blue color scheme, stored in supply chain network models 210. Mixed-reality user interface 202 generates a "Product/Facility/Time Period" mixed-reality cuboid visualization, illustrated by FIG. 5, displaying the selected data tables according to the selected KPIs, dimensions, and color schemes. Mixed-reality user interface 202 stores the generated "Product/Facility/Time Period" mixed-reality cuboid visualization in mixed-reality visualization data 226 of mixed-reality visualization system 110 database 114.

Continuing the example, and at action 312, mixed-reality user interface 202 generates a mixed-reality supply chain network visualization depicting the full supply chain network 100 from which the "Product/Facility/Time Period" data table data was drawn. Mixed-reality user interface 202 accesses supply chain network models 210 stored in mixed-reality visualization system 110 database 114, which in this example comprises a three-dimensional supply chain network 100 model that includes all nodes, connections, shipment pipelines, and other operating components of supply chain network 100 (including but not limited to the facilities that sell the products illustrated by the mixed-reality cuboid visualization illustrated by FIG. 5). Mixed-reality user interface 202 generates a mixed-reality supply chain network visualization displaying the components of supply chain network 100 in the form of a three-dimensional model of nodes and connections, illustrated by FIG. 6. Mixed-reality user interface 202 stores the generated mixed-reality supply chain network visualization in mixed-reality visualization data 226 of mixed-reality visualization system 110 database 114.

Continuing the example, and at action 314, mixed-reality visualization system 110 and rendering device 120 simultaneously display the generated "Product/Facility/Time Period" mixed-reality cuboid visualization and the mixed-reality supply chain network visualization. Data processing and transformation module 204 accesses the "Product/Facility/Time Period" mixed-reality cuboid visualization and the mixed-reality supply chain network visualization stored in mixed-reality visualization data 226. Data processing and transformation module 204 transmits the "Product/Facility/Time Period" mixed-reality cuboid visualization and the mixed-reality supply chain network visualization to memory 126 of rendering device 120. Rendering device 120 accesses the "Product/Facility/Time Period" mixed-reality cuboid visualization and mixed-reality supply chain network visualization stored in memory 126 and simultaneously displays the mixed-reality cuboid visualization and the mixed-reality supply chain network visualization on rendering device 120 display, as illustrated by FIG. 4.

Figure 4:
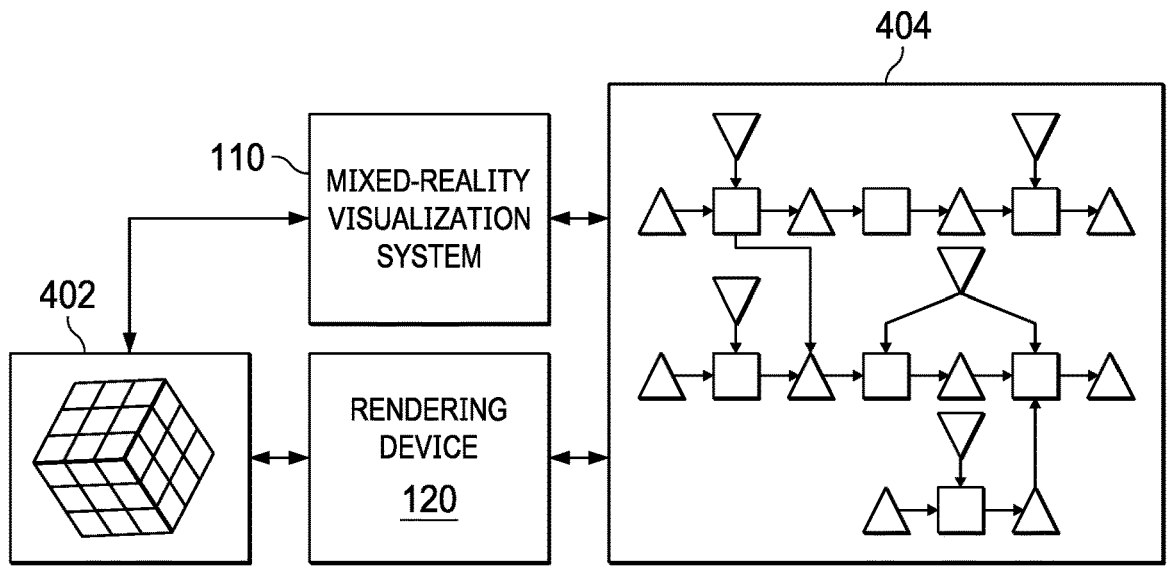
FIG. 4 illustrates the mixed-reality visualization system simultaneously generating a mixed-reality cuboid visualization display and a mixed-reality supply chain network visualization display, according to an embodiment.

FIG. 4 illustrates mixed-reality visualization system 110 simultaneously generating mixed-reality cuboid visualization display 402 and mixed-reality supply chain network visualization display 404, according to an embodiment. As illustrated by FIG. 4, mixed-reality visualization system 110 may generate, and display on rendering device 120 display, mixed-reality cuboid visualization display 402 (displaying, in this example, a "Product/Facility/Time Period" mixed-reality cuboid visualization) and mixed-reality supply chain network visualization display 404 (displaying, in this example, a network tree illustrating the flow of items between supply chain entities 150 in supply chain network 100). Although particular examples of mixed-reality visualization system 110 outputs are illustrated and described herein, embodiments contemplate mixed-reality visualization system 110 generating mixed-reality cuboid visualizations and mixed-reality supply chain network visualizations in any configuration, according to particular needs.

Continuing the example, mixed-reality user interface 202 simultaneously generates mixed-reality cuboid visualization display 402 and mixed-reality supply chain network visualization display 404. In this embodiment, one or more rendering device 120 sensors 122 respond to one or more user inputs (including but not limited to physical inputs, voice inputs, and visual inputs) to navigate between simultaneously-rendered mixed-reality cuboid visualization display 402 and mixed-reality supply chain network visualization display 404. As an example only and not by way of limitation, rendering device 120 sensors 122 may respond to one or more physical inputs, such as, for example, turning and panning rendering device 120 in three-dimensional space, to expand, contract, or otherwise alter the mixed-reality view of the "Product/Facility/Time Period" mixed reality cuboid visualization displayed by mixed-reality cuboid visualization display 402, the network tree by mixed-reality supply chain network visualization display 404, or both mixed-reality visualizations simultaneously. In this manner, the user of one or more rendering devices 120 may focus rendering device 120 display 128 on the "Product/Facility/Time Period" mixed-reality cuboid visualization displayed by mixed-reality cuboid visualization display 402 (best illustrated by FIG. 5), the network tree by mixed-reality supply chain network visualization display 404 (best illustrated by FIG. 6), or a combination of both the "Product/Facility/Time Period" mixed-reality cuboid visualization displayed by mixed-reality cuboid visualization display 402 and the network tree displayed by mixed-reality supply chain network visualization display 404 displayed together.

FIG. 5 illustrates exemplary mixed-reality cuboid visualization display 402 in greater detail, according to an embodiment. In an embodiment, mixed-reality cuboid visualization display 402 may comprise three-dimensional cuboid 504 comprised of a plurality of individual cubelets 506, display dimensions 508, cubelet data table 510, and explanatory text 512. Although FIG. 4 illustrates exemplary mixed-reality cuboid visualization display 402 as comprising three-dimensional cuboid 504 comprised of a plurality of cubelets 506, display dimensions 508, cubelet data table 510, and explanatory text 512 in a particular configuration, embodiments contemplate mixed-reality visualization system 110, mixed-reality user interface 202, and one or more rendering devices 120 generating mixed-reality cuboid visualization displays of any configuration and displaying any data stored in database 114, supply chain data 132, and/or cloud datastore 140 in any visual format, according to particular needs.

Continuing the example, in the embodiment illustrated by FIG. 5, mixed-reality cuboid visualization display 402 comprises three-dimensional cuboid 504 comprised of twenty-seven (27) individual cubelets 506, each of which represents an individual product-facility-time period sales intersection, corresponding to one cell on cubelet data table 510. Mixed-reality cuboid visualization display 402 displays data contained in the "Product/Facility/Time Period" data table (displayed by cubelet data table 510) according to the "product sales at various facilities over time" KPI and the three selected dimensions: "products," "facilities," and "time periods" (indicated by display dimensions 508). In the embodiment illustrated by FIG. 5, mixed-reality cuboid visualization display 402 displays the sales of three separate products (in this example, m1, m2, and m3) sold at three separate facilities (in this example, f1, f2, and f3) across three separate time periods (in this example, n1, n2, and n3), comprising 27 individual product-facility-time period sales intersections. In this example, mixed-reality user interface 202 displays each of the 27 individual product-facility-time period sales intersections as an individual cubelet 506, arranged to comprise three-dimensional cuboid 504 according to the "products," "facilities," and "time periods" dimensions. According to embodiments, explanatory text 512 may display one or more text messages, generated by mixed-reality user interface 202, to provide additional information explaining the arrangement and details of mixed-reality cuboid visualization display 402. Although FIG. 5 illustrates mixed-reality cuboid visualization display 402 in a particular configuration, embodiments contemplate mixed-reality visualization system 110 organizing and displaying cubelets in any cuboid configuration, according to particular needs.

According to embodiments, mixed-reality visualization system 110 may generate cuboids 504 comprising one or more "slices," which illustrates product-facility-time period sales intersection cubelets 506 for multiple products (m1, m2, and m3) sold at a single facility (such as, for example, f1) over multiple time periods (n1, n2, and n3); or one or more "stacks," which illustrates product-facility-time period sales intersection cubelets 506 for a single product (such as, for example, m2) sold at a single facility (such as, for example, f1) over multiple time periods (n1, n2, and n3).

FIG. 6 illustrates exemplary mixed-reality supply chain network visualization display 404 in greater detail, according to an embodiment. In an embodiment, mixed-reality supply chain network visualization display 404 may comprise network tree 602 comprising one or more nodes 604 and connections 606, and explanatory texts 608. Although FIG. 6 illustrates exemplary mixed-reality supply chain network visualization display 404 comprising network tree 602, nodes 604, connections 606, and explanatory texts 608, embodiments contemplate mixed-reality visualization system 110, mixed-reality user interface 202, and one or more rendering devices 120 generating mixed-reality supply chain network visualization displays of any configuration and displaying any data stored in database 114, supply chain data 132, and/or cloud datastore 140 in any visual format, according to particular needs.

In the embodiment illustrated by FIG. 6, mixed-reality supply chain network visualization display 404 comprises network tree 602. Network tree 602 comprises nodes 604 and connections 606 representing separate components and connections between components of supply chain network 100. According to embodiments, supply chain network 100 material storage and/or transition units may be modelled as nodes 604, which may be rendered on mixed-reality supply chain network visualization display 404 as spheres, cubes, triangles, pyramids, tetrahedrons, or other geometric shapes representing supply chain features. Each node 604 may represent a buffer for an item (such as, for example, a raw material, intermediate good, finished good, component, and the like), resource, or operation (including, for example, a production operation, assembly operation, transportation operation, and the like). Various transportation or manufacturing processes may be modelled as connections 606, such as, for example, edges, lines, or arrows, connecting nodes 604. Each connection 606 may represent the flow, transportation, or assembly of materials (such as items or resources) between nodes 604 by, for example, production processing or transportation. In an embodiment, connection 606 arrows may represent one-way flow, transportation, and/or assembly processes between nodes 604. Although particular examples of mixed-reality supply chain network visualization display 404 are illustrated and described herein, embodiments contemplate mixed-reality visualization system 110 generating mixed-reality supply chain network visualization displays 404 of any configuration, according to particular needs.

Continuing the example, and at action 316, mixed-reality visualization system 110 manipulates three-dimensional cuboid 504 displayed by mixed-reality cuboid visualization display 402, and manipulates network tree 602 displayed by mixed-reality supply chain network visualization display 404, in response to input received by rendering device 120. In this example, rendering device 120 sensors 122 detect physical inputs from a user operating rendering device 120. Rendering device 120 processors 124 transmit the physical input to mixed-reality user interface 202 of mixed-reality visualization system 110 server 112. In response to the physical input, mixed-reality user interface 202 manipulates three-dimensional cuboid 504 and network tree 602, and alters variables and data displayed by three-dimensional cuboid 504 and network tree 602. Mixed-reality visualization system 110 stores the altered variables and data in modified supply chain data 214 of mixed-reality visualization system 110 database 114, and generates one or more revised mixed-reality cuboid visualization displays 402 and mixed-reality supply chain network visualization displays 404 to display the altered variables and data. In this embodiment, mixed-reality visualization system 110 alters three-dimensional cuboid 504 in response to input received to network tree 602, and similarly alters network tree 602 in response to input received to three-dimensional cuboid 504, as illustrated by FIG. 7.

Continuing the example, and at action 316, mixed-reality visualization system 110 modifies three-dimensional cuboid 504, displayed on mixed-reality cuboid visualization display 402, to incorporate a new KPI, which rendering device 120 selects in response to input received by rendering device 120 sensors 122. In response to the selection of a new KPI, mixed-reality visualization system 110 chooses, on mixed-reality supply chain network visualization display 404, network tree 602 nodes 604 that correspond to the new KPI, and highlights nodes 604 that correspond to the new KPI on network tree 602. Mixed-reality visualization system 110 then chooses intersections and cubelets 506 of three-dimensional cuboid 504 that correspond to the now-highlighted nodes 604 on mixed-reality supply chain network visualization display 404, and generates revised mixed-reality cuboid visualization display 402 displaying the newly-chosen intersections and cubelets 506. Concluding with this example, mixed-reality visualization system 110 then terminates method 300.

In an embodiment, mixed-reality visualization system 110 permits one or more users of one or more rendering devices 120 to conduct supply chain network 100 analyses that leverage the strengths of mixed-reality cuboid visualization displays 402 and three-dimensional cuboids 504, along with the strengths of mixed-reality supply chain network visualization displays 404 and network trees 602 or other network visualizations. For example, according to embodiments, some analyses, such as slicing or stacking three-dimensional cuboids 504 and cubelets 506, may be best accomplished using mixed-reality cuboid visualization displays 402. Other analyses, such as isolating and emphasizing the upstream network for a particular demand, may be best accomplished using mixed-reality supply chain network visualization display 404. Mixed-reality visualization system 110 may continuously update both mixed-reality cuboid visualization display 402 and mixed-reality supply chain network visualization display 404 in response to input detected by rendering device 120 sensors 122, and may, for example, implement changes made to mixed-reality cuboid visualization display 402 on mixed-reality supply chain network visualization display 404, and vice versa.

FIG. 7 illustrates mixed-reality visualization system 110 altering three-dimensional cuboid 504 in response to input received to network tree 602, and altering network tree 602 in response to input received to three-dimensional cuboid 504, according to an embodiment. Although FIG. 7 illustrates mixed-reality visualization system 110 and rendering device 120 executing actions 702-716 in a particular configuration, embodiments contemplate mixed-reality visualization system 110 and/or rendering device 120 executing any actions in any order to alter three-dimensional cuboid 504 in response to input received to network tree 602, and alter network tree 602 in response to input received to three-dimensional cuboid 504, according to particular needs.

In an embodiment, rendering device 120 may detect one or more user inputs for search, navigation, visualization, and supply chain actions, including but not limited to user touch input, user speech/voice input, and/or user eye gaze input. By way of example only and not by way of limitation, mixed-reality visualization system 110 may modify, alter, and/or update mixed-reality supply chain network visualization display 404a in response to user input to mixed-reality cuboid visualization display 402a. In response to user input to one or more three-dimensional cuboids 504a displayed on mixed-reality cuboid visualization display 402a, mixed-reality visualization system 110 may perform action 702 and formulate one or more updated cubelets, stacks, slices, and/or cuboids. At action 704, mixed-reality visualization system 110 may identify dimensions relevant to the one or more updated cubelets, stacks, slices, and/or cuboids, and may identify, at action 706, one or more nodes 604 and connections 606 relevant to the one or more updated cubelets, stacks, slices, and/or cuboids. At action 708, mixed-reality visualization system 110 may superimpose one or more KPIs on the identified one or more nodes 604 and connections 606. At action 710, mixed-reality visualization system 110 may generate and display a modified network tree 602a displaying the superimposed one or more KPIs on the identified one or more nodes 604 and connections 606.

In other embodiments, mixed-reality visualization system 110 may modify, alter, and/or update mixed-reality cuboid visualization display 402a in response to user input to mixed-reality supply chain network visualization display 404a. By way of example only and not by way of limitation, in response to user input to one or more network trees 602a displayed on mixed-reality cuboid visualization display 404a, mixed-reality visualization system 110 may perform action 712 and select one or more nodes 604 and/or connections 606 of network tree 602a. At action 714, mixed-reality visualization system 110 may find related intersections and cubelets relevant to the selected one or more nodes 604 and/or connections 606. At action 716, mixed-reality visualization system 110 may modify and display, on mixed-reality cuboid visualization display 402a, one or more cuboids 504a that correspond to the related intersections and cubelets relevant to the selected one or more nodes 604 and/or connections 606.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a computer comprising a processor and memory and configured to:
  select data stored in a data table coupled to the computer;
  select one or more key process indicators (KPIs);
  select one or more dimensions by which to display the selected data;
  select one or more color schemes by which to display the selected data;
  generate a first mixed-reality object displaying the selected data as a cuboid model according to the selected one or more KPIs, dimensions, and color schemes;
  generate a second mixed-reality object displaying the selected data as a three-dimensional model of nodes and connections;
  display the first mixed-reality object and the second mixed-reality object on a display device;
  manipulate the first mixed-reality object to alter at least a first part of the selected data in the first mixed-reality object in response to input received by one or more sensors;
  in response to the at least a first part of the selected data being altered by manipulating the first mixed reality object, change a corresponding part of the display of the second mixed reality object not being manipulated;
  manipulate the second mixed-reality object to alter at least a second part of the selected data in the second mixed reality object in response to input received by the one or more sensors; and in response to the at least a second part of the selected data being altered by manipulating the second mixed reality object, change a corresponding part of the display of the first mixed reality object not being manipulated.

2. The system of claim 1, further comprising the computer generating an updated second mixed-reality object in response to a manipulation of the first mixed-reality object.

3. The system of claim 1, wherein the first mixed-reality object comprises one or more cubelets configured to display data stored in the data table, and the computer is further configured to:
 manipulate the cubelets in response to input received by the one or more sensors, the cubelet manipulation comprising one or more of:
  aggregating cubelet data by summation;
  removing cubelet data by subtraction;
  calculating the mean value of one or more groups of cubelets;
  calculating the median value of one or more groups of cubelets;
  calculating the mode value of one or more groups of cubelets; and
  displaying the highest single cubelet value within one or more groups of cubelets.

4. The system of claim 1, wherein the second mixed-reality object comprises one or more nodes and connections arranged in a network tree, and the computer is further configured to:
 manipulate the network tree in response to input received by the one or more sensors, the network tree manipulation comprising one or more of:
  adding one or more nodes to the network tree;
  removing one or more nodes from the network tree;
  adding one or more connections to the network tree;
  subtracting one or more connections from the network tree;
  highlighting one or more nodes or connections on the network tree;
  shadowing one or more nodes or connections on the network tree;
  expanding one or more nodes on the network tree; and
  contracting one or more nodes on the network tree.

5. The system of claim 1, further comprising the computer, after manipulating one of the first mixed-reality object and the second mixed-reality object in response to input received by the one or more sensors:
 transmitting instructions to one or more supply chain entities, the transmitted instructions comprising one or more of:
  an instruction to increase capacity at one or more supply chain locations;
  an instruction to alter demand or supply levels at one or more supply chain entities;
  an instruction to choose the location for a distribution center in a particular geographic region;
  an instruction to adjust product mix ratios; and
  an instruction to alter the configuration of packaging of one or more products.

6. The system of claim 1, wherein the input received by the one or more sensors comprises one or more of:
 a voice command;
 a hand gesture; and
 an eye movement.

7. A computer-implemented method, comprising:
 selecting, with a computer comprising a processor and memory, data stored in a data table coupled to the computer;
 selecting, with the computer, one or more key process indicators (KPIs);
 selecting, with the computer, one or more dimensions by which to display the selected data;
 selecting, with the computer, one or more color schemes by which to display the selected data;
 generating, with the computer, a first mixed-reality object displaying the selected data as a cuboid model according to the selected one or more KPIs, dimensions, and color schemes;
 generating, with the computer, a second mixed-reality object displaying the selected data as a three-dimensional model of nodes and connections;
 displaying, with the computer, the first mixed-reality object and the second mixed-reality object on a display device;
 manipulating, with the computer, the first mixed-reality object to alter at least a first part of the selected data in the first mixed-reality object in response to input received by one or more sensors;
 in response to the at least a first part of the selected data being altered by manipulating the first mixed reality object, change, with the computer, a corresponding part of the display of the second mixed reality object not being manipulated;
 manipulating, with the computer, the second mixed-reality object to alter at least a second part of the selected data in the second mixed reality object in response to input received by the one or more sensors; and
 in response to the at least a second part of the selected data being altered by manipulating, with the computer, the second mixed reality object, change, with the computer, a corresponding part of the display of the first mixed reality object not being manipulated.

8. The computer-implemented method of claim 7, further comprising generating, with the computer, an updated second mixed-reality object in response to a manipulation of the first mixed-reality object.

9. The computer-implemented method of claim 7, wherein the first mixed-reality object comprises one or more cubelets configured to display data stored in the data table, and further comprising:
 manipulating, with the computer, the cubelets in response to input received by the one or more sensors, the cubelet manipulation comprising one or more of:
  aggregating cubelet data by summation;
  removing cubelet data by subtraction;
  calculating the mean value of one or more groups of cubelets;
  calculating the median value of one or more groups of cubelets;
  calculating the mode value of one or more groups of cubelets; and
  displaying the highest single cubelet value within one or more groups of cubelets.

10. The computer-implemented method of claim 7, wherein the second mixed-reality object comprises one or more nodes and connections arranged in a network tree, and further comprising:
 manipulating, with the computer, the network tree in response to input received by the one or more sensors, the network tree manipulation comprising one or more of:

adding one or more nodes to the network tree;
removing one or more nodes from the network tree;
adding one or more connections to the network tree;
subtracting one or more connections from the network tree;
highlighting one or more nodes or connections on the network tree;
shadowing one or more nodes or connections on the network tree;
expanding one or more nodes on the network tree; and
contracting one or more nodes on the network tree.

11. The computer-implemented method of claim 7, further comprising, after manipulating one of the first mixed-reality object and the second mixed-reality object response to input received by the one or more sensors:
transmitting, with the computer, instructions to one or more supply chain entities, the transmitted instructions comprising one or more of:
an instruction to increase capacity at one or more supply chain locations;
an instruction to alter demand or supply levels at one or more supply chain entities;
an instruction to choose the location for a distribution center in a particular geographic region;
an instruction to adjust product mix ratios; and
an instruction to alter the configuration of packaging of one or more products.

12. The computer-implemented method of claim 7, wherein the input received by the one or more sensors comprises one or more of:
a voice command;
a hand gesture; and
an eye movement.

13. A non-transitory computer-readable storage medium embodied with software, the software when executed configured to:
select data stored in a data table;
select one or more key process indicators (KPIs);
select one or more dimensions by which to display the selected data;
select one or more color schemes by which to display the selected data;
generate a first mixed-reality object displaying the selected data as a cuboid model according to the selected one or more KPIs, dimensions, and color schemes;
generate a second mixed-reality object displaying the selected data as a three-dimensional model of nodes and connections;
display the first mixed-reality object and the second mixed-reality object on a display device;
manipulate the first mixed-reality object to alter at least a first part of the selected data in the first mixed-reality object in response to input received by one or more sensors;
in response to the at least a first part of the selected data being altered by manipulating the first mixed reality object, change a corresponding part of the display of the second mixed reality object not being manipulated;
manipulate the second mixed-reality object to alter at least a second part of the selected data in the second mixed reality object in response to input received by the one or more sensors; and
in response to the at least a second part of the selected data being altered by manipulating the second mixed reality object, change a corresponding part of the display of the first mixed reality object not being manipulated.

14. The non-transitory computer-readable storage medium of claim 13, wherein the software when executed is further configured to generate an updated second mixed-reality object in response to a manipulation of the first mixed-reality object.

15. The non-transitory computer-readable storage medium of claim 13, wherein the first mixed-reality object comprises one or more cubelets configured to display data stored in the data table, and the software when executed is further configured to:
manipulate the cubelets in response to input received by the one or more sensors, the cubelet manipulation comprising one or more of:
aggregating cubelet data by summation;
removing cubelet data by subtraction;
calculating the mean value of one or more groups of cubelets;
calculating the median value of one or more groups of cubelets;
calculating the mode value of one or more groups of cubelets; and
displaying the highest single cubelet value within one or more groups of cubelets.

16. The non-transitory computer-readable storage medium of claim 13, wherein the second mixed-reality object comprises one or more nodes and connections arranged in a network tree, and the software when executed is further configured to:
manipulate the network tree in response to input received by the one or more sensors, the network tree manipulation comprising one or more of:
adding one or more nodes to the network tree;
removing one or more nodes from the network tree;
adding one or more connections to the network tree;
subtracting one or more connections from the network tree;
highlighting one or more nodes or connections on the network tree;
shadowing one or more nodes or connections on the network tree;
expanding one or more nodes on the network tree; and
contracting one or more nodes on the network tree.

17. The non-transitory computer-readable storage medium of claim 13, wherein the software when executed is further configured to, after manipulating one of the first mixed-reality object and the second mixed-reality object in response to input received by the one or more sensors:
transmit instructions to one or more supply chain entities, the transmitted instructions comprising one or more of:
an instruction to increase capacity at one or more supply chain locations;
an instruction to alter demand or supply levels at one or more supply chain entities;
an instruction to choose the location for a distribution center in a particular geographic region;
an instruction to adjust product mix ratios; and
an instruction to alter the configuration of packaging of one or more products.

* * * * *